350-320 SR
OR 3,498,191
SEARCH ROOM

March 3, 1970 W. E. DICKINSON 3,498,191

METHODS OF PREPARING REFERENCE PATTERNS FOR PATTERN RECOGNITION SYSTEMS

Original Filed May 26, 1961 2 Sheets-Sheet 1

INVENTOR
WESLEY E. DICKINSON
BY
ATTORNEYS

INVENTOR.
WESLEY E. DICKINSON
BY Frasnard Bogucki
ATTORNEYS

United States Patent Office 3,498,191
Patented Mar. 3, 1970

3,498,191

METHODS OF PREPARING REFERENCE PATTERNS FOR PATTERN RECOGNITION SYSTEMS

Wesley E. Dickinson, San Jose, Calif., assignor to International Business Machines Corporation, Armonk, N.Y., a corporation of New York Original application May 26, 1961, Ser. No. 112,939, now Patent No. 3,234,392, dated Feb. 8, 1966. Divided and this application May 20, 1965, Ser. No. 457,377
Int. Cl. G03b *41/00*
U.S. Cl. 95—1 1 Claim

ABSTRACT OF THE DISCLOSURE

A method of preparing separate areas within a reference pattern element for automatic recognition of manifestations of intelligence such as speech repeats the given manifestation, such as spoken word, a number of times for sampling purposes. In each repetition, selected properties or speech characteristics in the manifestation being analyzed are monitored to ascertain their presence or absence in the repetition. For each such reading, a light is flashed for a selected interval to expose a chosen segmental area of a reference pattern film, which then effectively stores the cumulative total of the number of exposures. The film is developed in a non-linear manner to give complete reference pattern comprising a number of areal divisions, in each of which the number of exposures for each individual area are weighted so as to enhance the recognition function, as by representing the logarithm of the probability of occurrence of the property.

This invention relates to the recognition of meaningful visual and aural manifestations, and more particularly to processes for preparing reference patterns for the recognition of speech.

This application is a division of my prior application entitled "Pattern Recognition Systems," Ser. No. 112,939, now Patent No. 3,234,392, filed May 26, 1961.

The highly complex sounds of human speech and the complex patterns of printing and handwriting illustrate the difficulties involved in automatic pattern recognition. Currently, in order to supply data to modern high-speed electronic systems, it is usually necessary to prepare input information specially, as by punching cards, encoding magnetic characters on a sheet, or punching paper tape. These methods of converting input information to machine language are time consiuming, expensive, and subject to error. Many attemtps are currently being made, therefore, to devise systems for the automatic recognition of speech, print and handwriting. With such pattern recognition systems data processing operations can begin directly with information derived from the predominantly used modes of communication.

So many variations are encountered in speech and in writing, however, that complex compensating mechanisms have had to be adopted in recognition equipment. The human mind, of course, can readily distinguish the meaningful content of most communications despite the concurrent presence of what may be regarded as noise effects. As one example, handwriting is so highly individual that an expert can often identify the source even where an uncharacteristic style has been attempted by the writer. The same message, handwritten by a number of different persons, can be distinguished except where the writing is so unreasonably bad as to be illegible.

The recognition of speech poses subtler and additional problems, primarily because of the transitory nature of speech, and the greater number of variations possible. Meaning is derived by a listener from what is said and also from the manner in which it is said, despite differences in loudness, speech rate, intonation, pitch and inflection. The problems involved in the recognition of the primary information content of speech are nonetheless not insuperable, and marked advances toward automatic recognition have been made by electronic devices which respond to certain energy and frequency distributions in sound which can characterize particular spoken words or subunits of words. It has separately been shown that many spoken sounds, which may or may not correspond to phonetic syllables, may be reliably identified or distinguished through the existence of other selected properties. Clearly, as many of these different properties should be used as can reasonably be accommodated by a system without involving meaningless redundancies. The importance which can be attached to different properties and characteristics is, however, highly variable. Certain characteristics may be very reliable indicators when used in one word, but be quite ambiguous and indefinite as they occur in a different word. The various properties must therefore be weighted, and each combination of properties must be considered as a whole in identifying the manifestation which the combination represents.

This determination of the interrelationship between the different identifiable properties of a manifestation is a necessity for any versatile recognition machine. In providing a reference pattern or patterns for recognizable manifestations it has sometimes been the practice to use a number of repetitions of each manifestation, and to additively combine the effects of the repetitions. As one example, amplitude distributions with time in a spoken word may be used to generate correspondingly varying curves in rectangular coordinates. The curves then are superimposed on each other to provide an aggregate representation which accounts for minor variations. This technique, however, limits the number of properties which can be considered and is not readily repeatable. A different technique which is used is to provide calculated values for each property in a manifestation, but this requires a tedious collection and reduction of input data and is time consuming and expensive even if a high speed data processor is used. The processes heretofore used for gathering the necessary statistics have therefore been complex and prohibitively costly for use in practical applications.

It is therefore an object of the present invention to provide an improved process for preparing a reference pattern for use in automatic recognition machines.

Methods in accordance with the invention utilize successive steps in the preparation of a recognition pattern by which elemental areas of the recognition pattern are caused to have light transmissivity characteristics which vary according to the logarithm of the probability of occurrence of a given property in the manifestation involved.

In a specific example of methods in accordance with the invention, reference patterns for automatic recognition machines are prepared by photographic means under control of separate property measurement elements. At least a pair of lights is employed for each measurement to be made. As a given word is spoken successively by a person, or by different persons, a selected one of each of the light sets, representing either the existence or the absence of the selected property, or one of a group of conditions, is flashed for a predetermined duration. The variations in the manner in which the word is spoken, and in the resultant combinations of lights which are flashed, cause different exposures of the various areal divisions of the property reference pattern on the film, as the film is held fixed in a position corresponding to the sample word being entered. The film is then developed so that the opacity of a given areal division is proportioned to the logarithm of the probability of occurrence of the given property.

The foregoing and other objects, features and advantages of the invention will be apparent from the following more particular description of a preferred embodiment of the invention, as illustrated in the accompanying drawings.

The system which is here described is merely one example of manifestation and pattern recognition systems, but is particularly meaningful because it satisfies very critical requirements. Specifically, the example described is a speech recognition machine which is intended to recognize certain words out of a selected but nevertheless extensive vocabulary. It is intended to identify each spoken word of the vocabulary, irrespective of normal and reasonable variations in the speech of an operator or different operators, and to do so with sufficient rapidity for the input speech to take place at normal and convenient rates. Other examples of different kinds of pattern recognition might also be given, including recognition of printed and handwritten characters, as systems in accordance with the invention require only that pattern properties be identified.

Figures 1, 2, 3, 4:
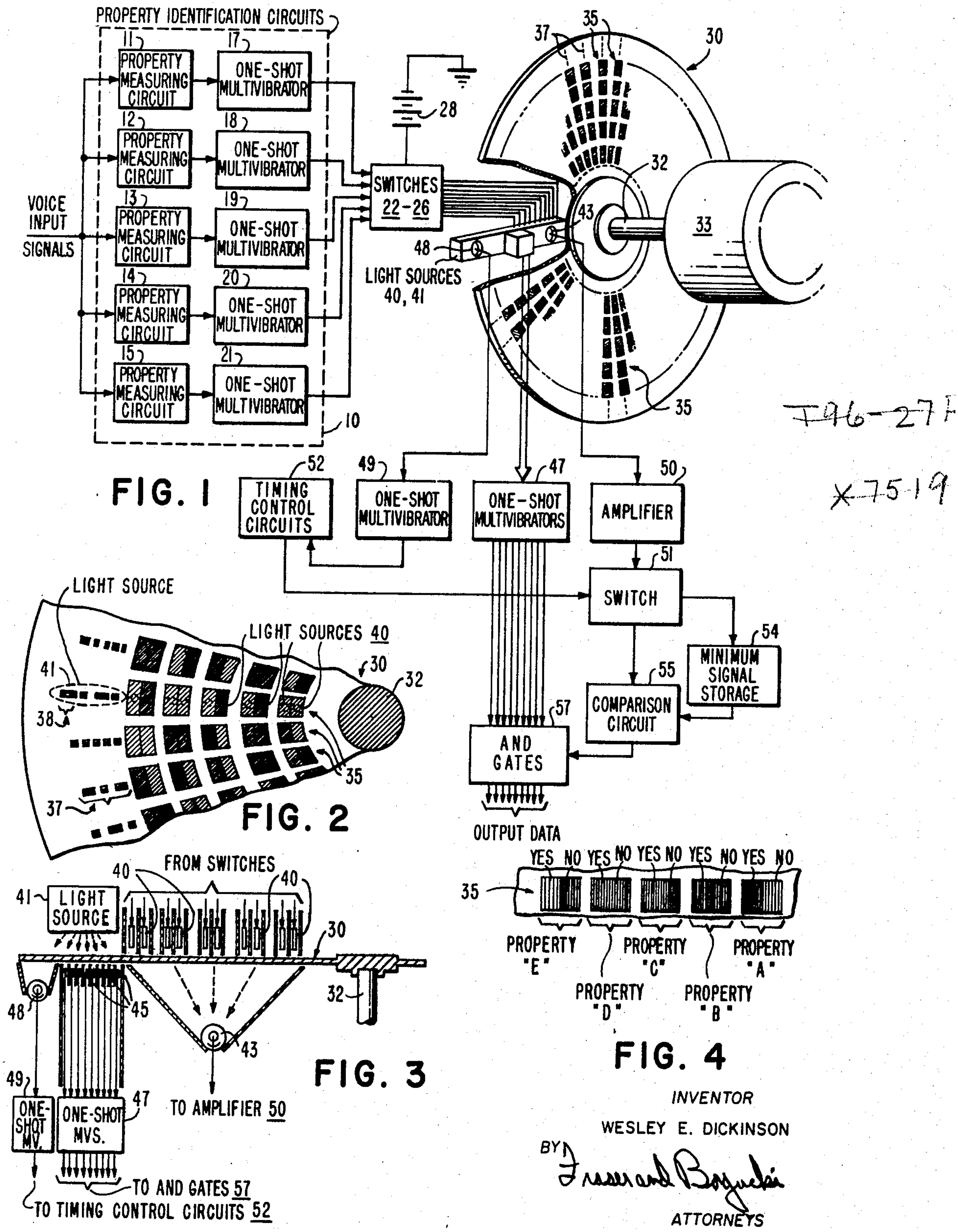
FIG. 1 is a combined block diagram and perspective view of one arrangement of a manifestation recognition system in accordance with the present invention.
FIG. 2 is an enlarged side view of a fragment of a reference pattern employed in the arrangement of FIG. 1.
FIG. 3 is a plan sectional view of a portion of the arrangement of FIG. 1.
FIG. 4 is an enlarged idealized representation of elemental reference pattern areas on the reference pattern of FIG. 2.

Referring now to FIGS. 1, 2 and 3, electrical signal representations of a spoken word as derived by a microphone and amplifier system (not shown) are provided by a group of separate measurement devices or property identification circuits 10. The identification circuits 10 include a number of individual property measuring circuits 11–15, selected in accordance with the stored vocabulary and the degree of reliability which it is desired to attain with the system. Because of the complexities involved in speech recognition, many different types of measurements have been evolved and conceived, and systems in accordance with the present invention are amenable to the use of most of these different measurements, even though the measurements themselves may be of wholly different types.

Early work in the field of speech recognition used frequency and energy distributions with time as a basis for distinguishing sound patterns. Sounds which are voiced, that is sounds which emanate primarily from resonance of the vocal cords, can be characterized by the existence of frequencies ranging up to several thousand or more cycles per second. The voiced sounds, for example, include most of the vowel sounds. It has been shown, moreover, that the different voiced sounds in a single multiple syllable word will often follow characteristic energy and frequency distribution patterns. Words are recognized by comparison of sample patterns to previously prepared standard patterns representative of such distributions. In these as well as in many other circuits, some form of "normalizing" is usually employed, so as to compensate for the different speech rate, amplitude and frequency characteristics of different individuals. Whether normalizing is used or not some selected time base is generally adopted.

The frequencies which characterize the voiced sounds are ascertainable even though the oscillations are of relatively brief duration and are damped by the human speech mechanism. The so-called "frictional" sounds, however, are much more noise-like in character and are typically distinguished by much higher frequency components which may be identified by appropriate filters. By closer analysis, various voiced and frictional sounds may be distinguished and a vocabulary of recognizable words built up, based upon the reference patterns.

Another more recent and potentially much more powerful technique does not require either normalization or the adoption of a time base, but segments each word in time in accordance with certain transitions in the word itself. According to this technique, voiced speech is very reliably identified by an asymmetry between components of opposite polarity in the complex multifrequency speech wave. Furthermore, by varying the phase relationship of these multifrequency components, the asymmetry characteristic changes in certain ways which distinguish the different kinds of voiced (or partially voiced) sounds from one another. Using these relationships, as well as the recognition of various frictional sounds, there are established "machine syllables" on which may be based a logical notation having both quality and time significance. Word recognition is then accomplished by comparison of generated sequences against stored sequences in appropriate switching arrangements. The use of machine syllables requires, when used in this way, considerable discrimination against noise as to each property. Greater reliability may be gained by increasing the number of properties. Yet, as described above, this entails a great deal of work in order to get best efficiency with a particular operator, and extensive changes may be needed for other operators. The present invention permits these different techniques and properties to be used together in a manner which allows the proper weight to be attached to each property.

The term "property measuring circuit" therefore should be taken to mean any type of measuring circuit which provides a meaningful output signal for pattern and manifestation recognition. Preferably, each of these circuits should include a threshold circuit or arrangement capable of providing a selected signal to noise ratio. Threshold circuits as such need not necessarily be employed, however, because the present system automatically compensates for probability factors. Here it should be noted that while only simple "yes-no" decisions are made here as to the various properties, the decisions may involve a greater number of alternatives. Energy content at a given frequency may be measured, for example, and different property indications given for each of a half dozen different levels. Output signals from each of the property measuring circuits 11–15 trigger different ones of a group of associated one-shot multivibrators circuits 17–21 respectively. The one-shot multivibrators 17–21 provide, when triggered, like pulses which are of selected duration and amplitude. In this arrangement, these pulses last for at least two cycles of operation of the associated reference pattern mechanism. The pulses control the operation of separate switches 22–26 respectively which are coupled to a regulated power supply 28 (shown schematically). The switches are arranged, in their normal state, to couple the power supply 28 to a first one of two output terminals. In this normal state, the switches indicate the absence of the property to which the associated measuring circuit 11–15 is responsive. Under control of the output signal from the associated one-shot multivibrator 17–21, however, each switch 22–26 couples the power supply 28 to the opposite output terminal for the selected duration. Signals on these output leads denote that the specific property has been detected in the voice input signals. For convenience, the properties are designated A, B, C, D and E respectively, and the presence of the property is indicated by A while the absence of the property is indicated by $\overline{A}$. If more alternatives were used for any property a corresponding number of lights and an appropriate trigger system would be used.

The A–E signals control the generation of light patterns in a word selection device which uses a variable opacity reference disc 30 having a transparent body. The reference disc 30 and associated light generating, light collecting and detecting elements are contained within an enclosure (not shown) which shields the operative elements from ambient light and where necessary from interference between the various independent light sources. The disc 30 rotates on a central shaft 32 which is driven by a constant speed motor 33.

Various property reference patterns 35 are disposed along radially extending segments about the circumference of the disc 30. Each radial segment is further divided along the radial direction into small areas which vary in opacity in a predetermined manner. Each radial segment also includes a word identification pattern 37 which serves to generate a desired digital code representative of the word with which the property pattern 35 is associated. An index pattern 38 is also disposed at one selected circumferential position about the disc 30.

These details may be better understood by reference to the view of FIG. 4 in addition to FIGS. 2 and 3. FIG. 4 represents a fragment, in greatly enlarged form, of a portion of the reference disc 30. The adjacent property patterns 35 are innermost relative to the disc 30, the word identification patterns 37 are next, and the index pattern 38 is at the outermost position, although this order may be shifted or reversed. Those skilled in the art will recognize that the disc 30 is merely one example of a cyclic member which moves so as to cause successive patterns to scan past a given axis. Each property reference pattern 35 has a pair of variable opacity areal divisions for each of the five properties, A, B, C, D and E which are used in this example. The areal divisions which make up each pair represent the presence and absence of the given property. When the number of possibilities for a given property is greater than two, the areal divisions are made to correspond in number. Each areal division has an opacity which is proportional to the logarithm of the probability that a given property condition will occur in the word which the property pattern represents. The word identification patterns 37, however, are used to generate a binary code and so consist of areal elements which are either of maximum transmissivity or of maximum opacity. A nine binary digit code is illustrated. The circumference upon which the index pattern 38 is positioned is entirely transparent except for the index pattern 38 itself, which serves as a marker to denote successive rotations of the drum 30 relative to a given fixed point or axis.

The signals A–E and $\overline{A}$–$\overline{E}$ which denote the presence and absence of the various properties for "yes-no decisions" control different ones of a set of like lights 40. In order to have high density storage of the data represented by the patterns on the drum 30, these lights 40 are preferably very small, and may be neon elements, electroluminescent elements, or the like. It is particularly to be noted that all the lights 40 should have like characteristics, including intensity, aging and response characteristics. A single light 41 is employed in conjunction with the word identification patterns 37 and the index pattern 38, but this light 41 is shielded from the property patterns 35. The lights 40, 41 are positioned along a selected fixed radial axis relative to the drum 30, and thus disposed so that the patterns on the drum successively scan past during rotation. Each of the lights 40 is aligned with a different areal division of the property patterns 35.

A light collector system is employed adjacent the property or reference patterns 35, so that light beams directed through the disc 30 from the lights 40 impinge similarly on a single photosensitive element 43, here shown as a photocell, although any photosensitive mechanism having sufficient sensitivity may be used. Separate photosensitive elements 45, appropriately shielded (see FIG. 3) so as to receive only light passing through a corresponding digital valued area, are employed in conjunction with the word reference pattern 37. Each of these elements 45 is coupled to an associated one-shot multivibrator 47, the pulse groups provided at the output terminals of the one-shot multivibrators 47 thus forming in binary code the successive words represented on the drum 30 as they pass the elements 45. At the radius of the drum 30 containing the index pattern 38 position there is employed a single photosensitive element 48 coupled to a one-shot multivibrator 49 and providing pulses which mark the passage of the index pattern 38 through the fixed axis.

An amplifier circuit 50 coupled to the photosensitive element 43 applies signals generated thereby to a switch 51 which is operated by a timing control circuit 52. The timing control circuit 52 operated during successive cycles of the disc 30 to switch the signals from the photosensitive element 43 either to a minimum signal storage circuit 54 or to a comparison circuit 55 on alternate cycles of the disc 30. Because the signal representative of a word need not be applied to synchronism with the rotation of the disc 30, the timing control circuit 52 is utilized to insure that at least one full rotation of the disc 30 is provided for storing the minimum signal derived from the reference pattern mechanism, and that another full rotation is then provided for identification of the word by comparison of the transitory signal from the element 43 to the stored signal level. The timing control circuit 52, therefore, responds to the pulse from the one-shot multivibrator 17–21 and to the index pulses from the one-shot multivibrator 49 to control the switch 51 so that the signals from the amplifier 50, following a pulse from a one-shot multivibrator 17–21, are provided to the minimum signal storage circuit 54 during the remainder of the revolution, and during the next complete revolution of the disc 30. Upon completion of the full revolution of a disc 30, the index pulse applied to the time control circuits 52 actuates the switch 51 so that the signals derived from the photosensitive element 43 are applied to the comparison circuit 55. Effectively, therefore, the timing control circuit 52 is a triggered bistable device.

The minimum signal storage circuit 54 may be merely a capacitive circuit which is charged to a level determined by minimum excitation of the photosensitive element 43. The comparison circuit 55 is an amplitude responsive circuit and provides an output signal, at the one point in the second full rotation of the disc 30 at which the stored signal and the transitory signal are substantially equal.

When an output signal is provided from the comparison circuit 55, a digital code value is also derived from the word identification patterns 37. The pulse groups from the one-shot multivibrators 47 are applied to "AND" gates 57 and are gated through the "AND" gates 57 under control of the output signals from the comparison circuit 55.

The manner in which this system automatically takes into account the probability of specific proper conditions may be better understood by reference to FIG. 4. The five different "yes-no" properties A–E which here serve as the basis for word recognition are represented by the light transmissivity characteristics of different pairs of areal divisions on a property reference pattern 35 on the disc 30. Light transmissivity variations which may exist for different words are shown in idealized and enlarged form. These variations are represented as opacity gradations against a transparent background with the highest degree of opacity corresponding to the highest probability to be encountered. It will be recognized that the light transmissivity variations need not be represented by differences in opacity, but may also be represented by differences in the light reflectivity of shaded areas. The optical sensing system which is employed may similarly assume a number of different forms, although the arrangement shown in FIGS. 1–4 is preferred.

Each of the paired variable opacity areas corresponding to a given property is meaninglyfully used in establishing the interrelationship between the properties found to exist in a given word. Where there is an extremely high probability that a property will be present, the corresponding one of the paired areas (designated the "yes" area in FIG. 4 to denote the existence of the property) is highly opaque, and here represented as a darkened area. The other area, designated "no" to connote the absence of the property, then has a degree of opacity which is complementary on a logarithmic scale to the opacity of the "yes" area. Such a condition is represented in FIG. 4 by property "A." Where the significance of a property as applied to a given spoken word is less definite, the opacities of the "yes" and "no" areas are both intermediate the extremes. A condition in which the "yes" is slightly more probable than the "no" is shown for property B. Property C, in which the "no" area is slightly more opaque than the "yes" area represents the converse, in which it is more likely that the property will be absent, although there is still some probability that the property will be found to exist. Properties "D" and "E," in which the "no" areas are strongly opaque, are properties which are unlikely to be found to exist in conjunction with the given word.

With a set of areal divisions greater than two in number only one of the areal divisions need have an opacity gradation. With more than two alterativies only positive indications of the presence of a property are given.

Now, as described below, the gradation of the opaque areas is in accordance with the logarithm of a probability and not in accordance with the probability itself. If there is a nine out of ten chance that a given property will be found to exist (or be absent) the opacity of the corresponding area is not 90%, but the appropriate logarithmic value thereof.

This arrangement, therefore, does not rely directly upon the "yes-no" or "one out of a number" decisions in the property measuring circuits 10, but initiates a combined digital and analog decision making sequence by actuating the lights 40 adjacent the property patterns 35 in a pattern determined by the spoken word sample. This light pattern is held for a first complete revolution of the reference disc 30, during which the various property patterns 35 scan across the axis of the lights 40 in sequence. All of the areal divisions of each property pattern 35 pass across the set of lights 40 at the same time. In the intervals between registration of the successive property patterns 35, there is maximum light transmission through the disc 30 because of the transparent background of the disc 30, and a maximum signal level is provided by the photosensitive element 43.

The first complete revolution of disc 30 may be referred to as a storage cycle, because during this revolution the signals provided from the photosensitive element 43 are applied through the switch 51 to the minimum signal storage circuit 54. The minimum signal level is derived when the pattern in which the lights 40 have been excited results in the least transmission of light through the disc 30. On the next revolution the transistory signal from the element 43 is compared to the stored signal, and the comparison output signal is provided at the instant when the property pattern 35 for the most likely word crosses the axis. At this time the word recognition pattern is read out through the "AND" gates 57.

Those properties, such as properties "B" and "C" in FIG. 4, which have intermediate opacity gradations prevent the stored signal from ever approaching absolute zero. This would signify that a word had been recognized with absolute certainty which is, of course, not realistic. On the other hand, it may intuitively be seen that the use of logarithmic factors for the different properties materially enhances accuracy and reliability. For other words than the one correct word the light transmitted will usually be appreciably greater, because a significant property will not be present in the correct relationship. Where the pattern in which the lights 40 are excited varies only as to the less sharply defined properties, optimum results are still achieved for the given conditions. What the system indicates is the closest related word to the word input, or the "best match," whether or not the input word is included in the system library.

Figure 5:
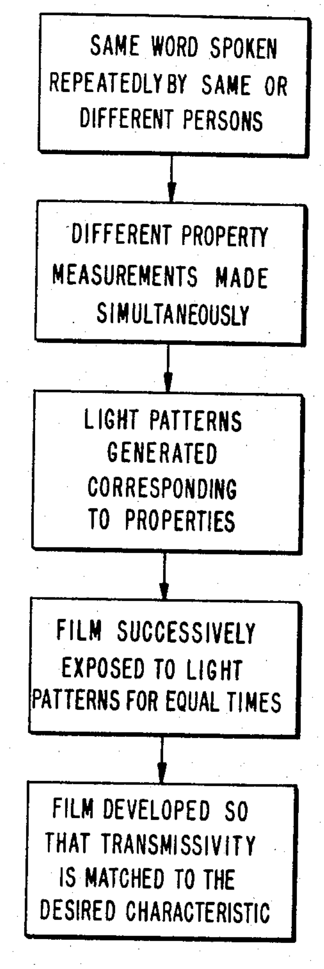
FIG. 5 is a block diagram showing successive steps which may be employed in methods in accordance with the present invention.

One example of the way in which a reference pattern may be prepared photographically in accordance with the invention is illustrated in FIG. 5. The mechanism which is used may be essentially that shown in FIGS. 1–4 except that the light sensitive material of the reference member is, of course, initially unexposed and undeveloped. The light sources to which the light sensitive material is exposed are actuated for precisely controlled intervals in response to identification of the various properties. The property patterns may be imposed directly on the disc itself, after application of a light sensitive film, or on separate film frames or plates from which the patterns may be transferred mechanically or by photographic means to a disc or other reference member. An appropriately configured image mask may be used adjacent the light sensitive member so that the light spot outline is sharply defined and the exposure intensity is uniform across the entire illuminated area. Furthermore, the intensity of each of the illuminating sources, and the durations for which they are excited, are the same for each exposure, both as between different lights, and as to successive exposures.

With this mechanism, property patterns as to reference words may be established by having an individual speak the same word a number of times in succession, or by having a number of individuals speak the same word separately at different times. The choice as to the manner in which this is done will largely be determined by the ultimate use of the word recognition machine, and whether it is to be employed with a specific selected operator or a number of different operators. As each word is spoken, the property measurement circuits respond to the electrical signals representative of the word by identifying the existence or absence of the selected properties in the word, with "yes-no" decisions, or by identifying specific conditions of a given property having more alternatives. As described above, the property measurement circuits may respond to frequency-time distributions, particular frequency characteristics, asymmetry characteristics and a wide variety of other selected information, such as the occurrence of more than one voiced sound in the selected word. Each time a given word is spoken, the property characteristics are indicated by the excitation of one of the pair or set of lights which is used for the property. The inevitable differences in modulation and expression of the same word will usually result in different light patterns during at least some of the successive enunciations. As reference samples are accumulated, however, the areal divisions for the given properties come to represent, through extent of exposure, the probability that the specific property conditions will occur in the word. Because of the highly variable nature of speech, few indications will be invariant, and property conditions will usually be identified to an intermediate degree. Each of the elemental areas of a pair or set corresponding to that property will, therefore, be exposed somewhat, in a proportionality dependent upon the number of times each of the associated light sources has been actuated.

It should be noted that there is a relationship between the probability value which can be attached to a given reading and the threshold level at which the associated measurement circuit is set. If, for example, a high amplitude signal is required to exceed the threshold level and to provide an output signal indicative of the existence of a property, there should be a sharper contrast between the "yes" and "no" areas of the pairs for the majority of properties. In effect, the "no" areas will be accentuated. This limits the usefulness of the individual properties, however. The selection as to the threshold level must, therefore, be made relative to the total number of properties which are available and to the total number of readings which it is desired to use in generating the light patterns for exposure.

Finally, in accordance with the invention, the exposed film is developed in a controlled fashion. The development is such (see FIG. 6) that the opacity (more generally, the density) of a given area is made proportional to the logarithm of the probability of the occurrence of a condition. The number of exposures of a given areal division is a measure of the probability of occurrence of the condition which the division represents. The photochemical change in the sensitized film with exposure is such that, in combination with the development process, the desired logarithmic variations is closely approximated.

Figure 6:
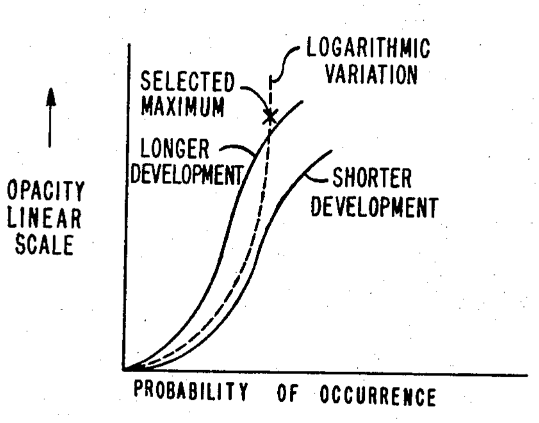
FIG. 6 is a graphical representation of one manner in which a reference pattern may be processed in methods in accordance with the invention.

As shown in FIG. 6 the normal development characteristic of the film, when exposure is plotted against the resultant opacity, is somewhat S-shaped, but approximates the ideal logarithmic curve for brief and intermediate exposure times. These S-shaped curves vary in slope, depending upon the development time which is used. At peak values, opacity levels off, so that the maximum opacity must be selected to be within the region of the ideal curve. The position of the curve may be varied along the abscissa by selecting the individual exposure intervals. Then, the development may empirically be controlled so as to simulate the logarithmic function. If desired, samples exposed under known conditions may first be developed separately to provide known standards for final adjustment.

Among the many advantages which accrue from this process it is important to note the simplicity by which statistics may be gathered and used to define extremely complex relationships. Heretofore, close analysis of the speech characteristics of one person has had to be made preparatory to an extensive compilation of a vocabulary. The larger the vocabulary, the more difficult and time consuming has been the problem of proper weighting of individual factors. With methods in accordance with the invention, however, directly usable reference patterns are provided without the need of complex additional equipment.

In generating the patterns during the accumulation of reference samples it may be convenient to use a recording of words in a specific sequence, and then to sort the word patterns out and actuate the light system. In this way a complete reference member may be provided and developed at high speed. Or an individual operator may position the reference member and enter successive or repeated reference word patterns.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of preparing a reference pattern for speech recognition machines, the reference pattern providing a reference vocabulary by statistically weighted representations of different selected properties of speech as they occur in different words, which includes the steps of successively illuminating sets of areas of a light sensitive film in accordance with actual identification of the selected properties in a repeated series of each spoken word, such that separate areas are exposed to light for total times in an additive accumulation of the specific property conditions in the different repetitions of each spoken word, and developing the film to convert the additive accumulations to logarithmically varying gradations in the opacity of the film, with the greatest opacity being representative of the greatest number of exposure.

References Cited

UNITED STATES PATENTS

| | | | |
|---|---|---|---|
| 1,781,550 | 11/1930 | Kwartin | 179—100.3 |
| 2,590,110 | 3/1952 | Lippel. | |
| 3,006,713 | 10/1961 | Klein et al. | 346—108 |
| 2,519,194 | 8/1950 | Maurer | 179—100.31 X |
| 3,116,963 | 1/1964 | Kiyasu | 346—107 |
| 3,292,148 | 12/1966 | Giuliano | 340—146.3 |

MAYNARD R. WILBUR, Primary Examiner

L. H. BOUDREAU, Assistant Examiner